& Kindness# United States Patent [19]

Burhans

[11] Patent Number: 4,679,750
[45] Date of Patent: Jul. 14, 1987

[54] LATCH SYSTEM

[75] Inventor: Frank M. Burhans, Bellevue, Wash.

[73] Assignee: The Boeing Company, Seattle, Wash.

[21] Appl. No.: 622,580

[22] Filed: Jun. 20, 1984

[51] Int. Cl.$^4$ .............................................. B64D 29/06
[52] U.S. Cl. .......................... 244/129.4; 292/DIG. 49; 292/100
[58] Field of Search ............... 244/129.4, 129.5, 129.1; 292/100, 113, 126, 200, DIG. 31, DIG. 49, DIG. 57, 97, 256.69, 256.5; 49/13, 366, 367

[56] References Cited
U.S. PATENT DOCUMENTS

| 1,519,717 | 12/1924 | Bilodeau | 292/200 |
| 2,145,998 | 2/1939 | Sonnhalter | 292/1 |
| 2,381,966 | 8/1945 | Bishop et al. | 268/46 |
| 2,438,238 | 3/1948 | Tonkin | 49/366 |
| 2,559,736 | 7/1951 | Scarborough | 292/226 |
| 2,659,803 | 11/1954 | Summers | 292/113 |
| 2,703,431 | 3/1955 | Tatom | 16/147 |
| 2,710,214 | 6/1955 | Summers | 292/247 |
| 2,714,032 | 7/1955 | Summers | 292/247 |
| 2,721,750 | 10/1955 | Rudis et al. | 292/139 |
| 2,732,238 | 1/1956 | Dornberg | 292/113 |
| 2,783,072 | 2/1957 | Sessler | 292/256 |
| 2,800,346 | 7/1957 | Manning | 292/113 |
| 2,832,446 | 4/1958 | Smith et al. | 189/35 |
| 2,896,751 | 7/1959 | Henrichs | 189/35 |
| 2,904,141 | 9/1959 | Henrichs | 189/35 |
| 3,194,595 | 7/1965 | Wheeler et al. | 292/113 |
| 3,347,578 | 10/1967 | Sheehan et al. | 292/113 |
| 3,541,794 | 11/1970 | Johnston et al. | 60/226 |
| 3,919,808 | 11/1975 | Simmons | 49/367 |
| 4,044,973 | 8/1977 | Moorehead | 244/54 |
| 4,053,177 | 11/1977 | Stammreich et al. | 292/113 |
| 4,335,909 | 6/1982 | Schmitz, Jr. | 292/5 |
| 4,365,775 | 12/1982 | Glancy | 244/53 |
| 4,549,708 | 10/1985 | Norris | 244/129.4 |

Primary Examiner—Galen Barefoot
Attorney, Agent, or Firm—Christensen, O'Connor, Johnson & Kindness

[57] ABSTRACT

A latch system is provided for an aircraft nacelle. In one embodiment, the nacelle (10) comprises first (24) and second (18) cowls that are hingedly mounted to the nacelle for pivotal movement between closed, operational positions and open, maintenance positions. The latch system comprises latch means (42) movable to and from a latched position in which the latch means holds the first cowl in its closed position and prevents it from moving to an open position. The latch means includes locking means (152, 168) associated with the second cowl for holding the latch means in its latched position when the second cowl is in its closed position. As a result, the first cowl is held in its closed position when the second cowl is in its closed position. In a second embodiment, a disengageable latch (40) is provided for latching the edge of a cowl remote from the cowl hinge point (132). The latch comprises a toggle linkage (70, 86) movable to and from a latched position in which the toggle linkage engages the cowl and holds the cowl in its closed position and prevents it from moving to an open position, and a locking member (100) pivotally mounted to the nacelle for rotation to and from a locking position in which the locking member abuts the toggle linkage and holds the toggle linkage in its latched position.

34 Claims, 8 Drawing Figures

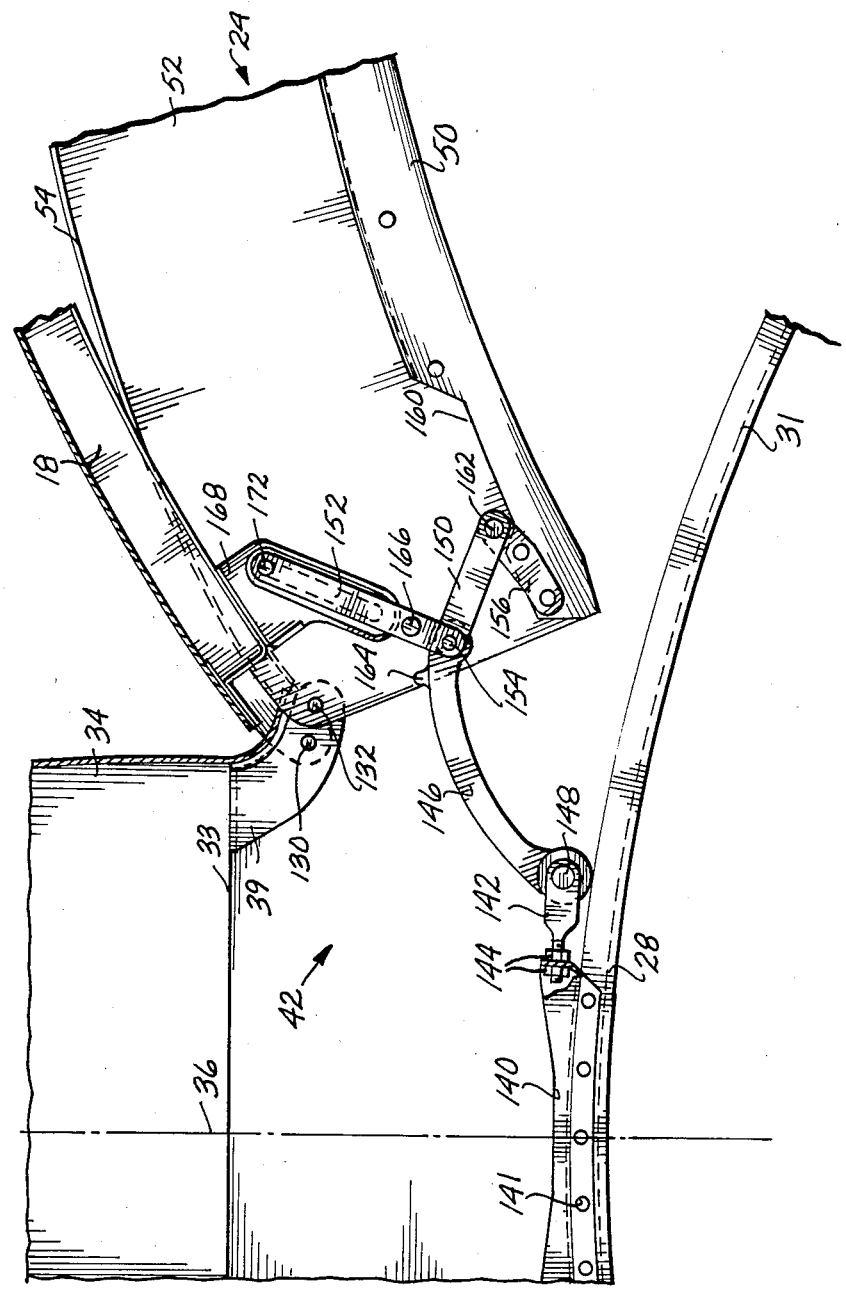

LATCH SYSTEM

FIELD OF THE INVENTION

This invention relates to latch systems for hinged structures, and in particular to latch systems for cowls of an aircraft nacelle.

BACKGROUND OF THE INVENTION

Modern jet engines commonly include a pair of thrust reverser ducts or cowls which, during aircraft operation, define the outer wall of the engine exhaust nozzle. Such thrust reverser ducts must be capable of withstanding considerable loads caused by the high pressure of the jet exhaust stream which it contains. The thrust reverser ducts are normally hingedly connected to the upper portion of the nacelle near the point where the nacelle is attached to the engine support strut. The ducts can be pivoted upwards about their hinge points to provide access to the engine for maintenance and repair. For aircraft operation, the ducts are pivoted downwards into closed positions in which their lower ends are adjacent to one another, or adjacent to an interposed strut, services channel or bifurcation. The closed ducts are then secured by latches to form a continuous circumferential load bearing structure.

The design of latches for thrust reverser ducts is complicated by a number of factors. For example, thrust reverser ducts must have an appreciable thickness in order to accommodate flow reversing cascades, and the inner surfaces of the ducts must include a load bearing member or ring to withstand the aforementioned loads due to internal pressure. Furthermore, a large circumferential force must be applied during latching to ensure satisfactory flange seating. The hinge line of the ducts, however, must be adjacent their outer surfaces to avoid interference with adjacent structure when the ducts are opened. As a result, a latch system for such thrust reverser ducts must include upper latches for latching together the upper ends of the load bearing rings near the top of the nacelle, as well as lower latches for connecting the lower ends of the load bearing rings to form a continuous circumferential load bearing structure. The upper latches of such a system are quite inaccessible. They are not only located inboard of the outer surface of the nacelle, but in a typical airplane installation they are a considerable distance above the ground as well. In the past, complex mechanical linkages or electrical actuators have been required to permit such latches to be locked and unlocked from ground level. Furthermore, since the latches are not visible when the ducts have been closed, means have been required for enabling maintenance personnel to confirm that the latches are locked after the ducts have been closed. In practice it is desirable that the upper latch system be nondisengaging because of its inaccessibility but the lower latch system must disengage.

SUMMARY OF THE INVENTION

The present invention provides a latch system for an aircraft nacelle which avoids the aforementioned accessibility limitations. The latch system of the present invention is adapted for use with a nacelle comprising first and second cowls, each cowl being hingedly mounted to the nacelle for pivotal movement between a closed, operational position and one or more open, maintenance positions. The latch system comprises latch means movable to and from a latched position in which the latch means holds the first cowl in its closed position and prevents it from moving to an open position, the latch means including locking means associated with the second cowl for holding the latch means in the latched position when the second cowl is in its closed position. As a result, the first cowl is held in its closed position when the second cowl is in its closed position.

In a preferred embodiment, the first cowl includes an edge along which the first cowl is mounted to the nacelle, and the latch means is connected to the first cowl adjacent such edge. The latch system may also include second latch means for selectively connecting an opposite edge of the first cowl to the nacelle. The first mentioned latch means may comprise a first link arm pivotally connected to the nacelle at a first pivot point, a second link arm pivotally connected to the first cowl at a second pivot point, and nondisengaging connecting means connecting the first link arm to the second link arm. Since the connecting means is nondisengaging, the first cowl remains connected through the latch means to the nacelle when the first cowl is moved to an open position, and separate means are not required for confirming that the latch means is engaged after the firs cowl has been closed.

In a further aspect of the invention, the first cowl comprises a semicylindrical sheet having an edge, spaced-apart inner and outer surfaces, and a load bearing ring extending in a circumferential direction along the inner surface of the cowl. The first cowl is hingedly mounted to the nacelle along such edge adjacent the outer surface of the cowl, and the latch means engages one end of the ring.

In a further aspect of the present invention, a latch system is provided for a nacelle comprising a pair of first cowls and a pair of second cowls, each cowl being hingedly mounted to the nacelle for pivotal movement between a closed position and one or more open positions. The pair of first cowls in their closed positions substantially define a cylindrical passage. The latch system comprises latch means associated with each first cowl, each latch means being movable to and from a latched position in which its associated first cowl is held in its closed position. Each latch means includes locking means associated with one of the second cowls for holding the latch means in its latched position when the associated second cowl is in its closed position. Each first cowl is thereby held in its closed position when the associated second cowl is in its closed position.

In a further aspect of the invention, a latch is provided for an aircraft nacelle, the latch comprising toggle linkage means and locking means. The toggle linkage means is movable to and from a latched position in which the toggle linkage means engages the cowl and holds the cowl in its closed position and prevents it from moving to an open position. The locking means is adapted for holding the toggle linkage means in its latched position. The locking means includes a locking member pivotally mounted to the nacelle for rotation to and from a locking position in which the locking member abuts the toggle linkage means and holds it in its latched position.

These and other features and aspects of the invention will become apparent in the detailed description and claims to follow, taken in conjunction with the accompanying drawings.

BRIEF DESCRIPTION OF THE DRAWINGS

FIG. 8 is a front elevational view of the upper latch assembly of FIG. 6 in an unlatched position with the thrust reverser duct open.

DETAILED DESCRIPTION OF THE INVENTION

Figure 1:
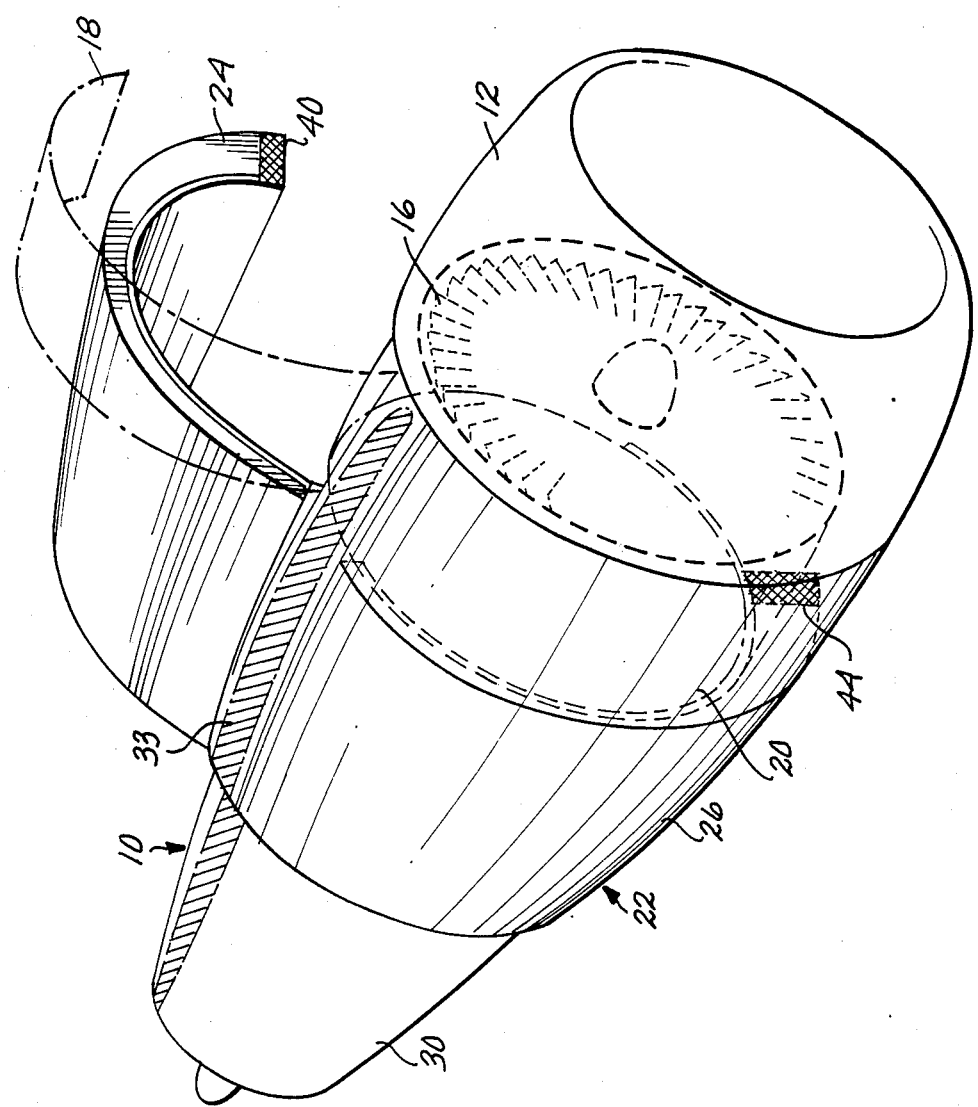
FIG. 1 is a perspective view of an aircraft engine nacelle.
Figure 2:
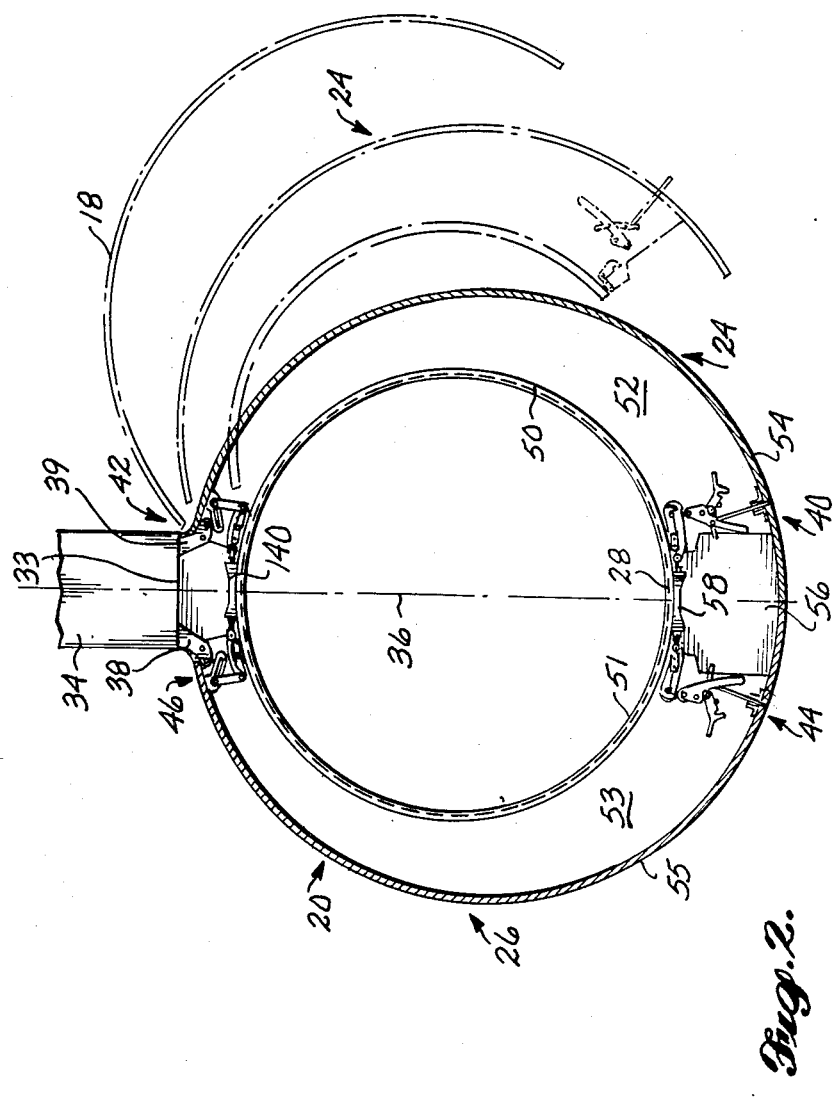
FIG. 2 is a vertical cross-sectional view of an aircraft engine nacelle showing a latch system according to the present invention comprising upper and lower latch assemblies.

Referring initially to FIGS. 1 and 2, a jet engine nacelle 10 is shown comprising inlet assembly 12, thrust reverser assembly 22, core assembly 30 and fan cowls 18 and 20. Fan 16 and fan case 28 (FIG. 2) are part of the jet engine and are shown for reference. Each fan cowl 18 and 20 is capable of being moved between an open, maintenance position, as illustrated by fan cowl 18, and a closed, operating position, as illustrated by fan cowl 20. Both fan cowls pivot about hinge points near the upper portion of nacelle 10, as hereinafter described in greater detail.

Thrust reverser assembly 22 comprises thrust reverser ducts 24 and 26. Each thrust reverser duct is capable of being moved between an open, maintenance position, as illustrated by thrust reverser duct 24, and a closed, operating position, as illustrated by thrust reverser duct 26. During normal aircraft engine operation, fan 16 forces air through an exhaust nozzle formed between the closed thrust reverser ducts and core assembly 30. During reverse thrust operation, this airflow is interrupted, and the air is instead forced through a plurality of flow reversing cascades (not shown) in the thrust reverser ducts. In either instance, the thrust reverser ducts are subjected to substantial hoop loads caused by the high pressure air flowing therein, and the system for latching the thrust reverser ducts in their closed positions must be adapted to withstand and transmit such loads.

Fan cowls 18 and 20 and thrust reverser ducts 24 and 26 each comprises a semicylindrical sheet member having generally linear edges. The rear portions of the fan cowls overlap slightly with the forward portions of the thrust reverser ducts, with the fan cowls being positioned radially outward with respect to the thrust reverser ducts. FIG. 2 shows a cross section of nacelle 10 through the area of overlap. The nacelle is supported at interface surface 33 by strut 34, and is generally symmetrical about vertical centerline 36. Fan cowls 18 and 20 and thrust reverser ducts 24 and 26 are hingedly mounted by supports 38 and 39. When thrust reverser ducts 24 and 26 are in their closed positions, the lower ends of the thrust reverser ducts are secured together by lower latch assembly 40, lower latch assembly 44, and crosstie fitting 58. Similarly, the upper ends of the thrust reverser ducts are fastened together by upper latch assembly 42, upper latch assembly 46, and crosstie fitting 140. Crosstie fittings 58 and 140 are secured to engine fan case 28. Thrust reverser duct 24 includes inner flange 50, forward bulkhead 52, and outer flange 54. Forward bulkhead 52 comprises a radial plate joining the inner flange to the outer flange near the forward end of thrust reverser duct 24. Similarly, thrust reverser duct 26 comprises inner flange 51, forward bulkhead 53, and outer flange 55. When the thrust reverser ducts are in their closed and latched positions, a continuous circumferential load bearing circular structure is formed comprising inner flanges 50 and 51, crosstie fittings 58 and 140, lower latch assemblies 40 and 44, and upper latch assemblies 42 and 46. The inner edges of inner flanges 50 and 51 are V-shaped and are received within matching V-groove 31 (FIG. 3) in the outer surface of engine fan case 28, thus securing the closed thrust reverser ducts against fore-to-aft motion with respect to the fan case.

The configuration shown in FIG. 2, wherein the lower ends of the thrust reverser ducts are connected by a crosstie fitting and two lower latch assemblies, is particularly adapted to those situations in which area 56 outboard of the underside of the engine fan case near centerline 36 is required for equipment related to the engine installation. It is to be understood that if area 56 is not required for such equipment, then a single latch may be used to connect the lower ends of the thrust reverser ducts directly to one another.

Figure 3:
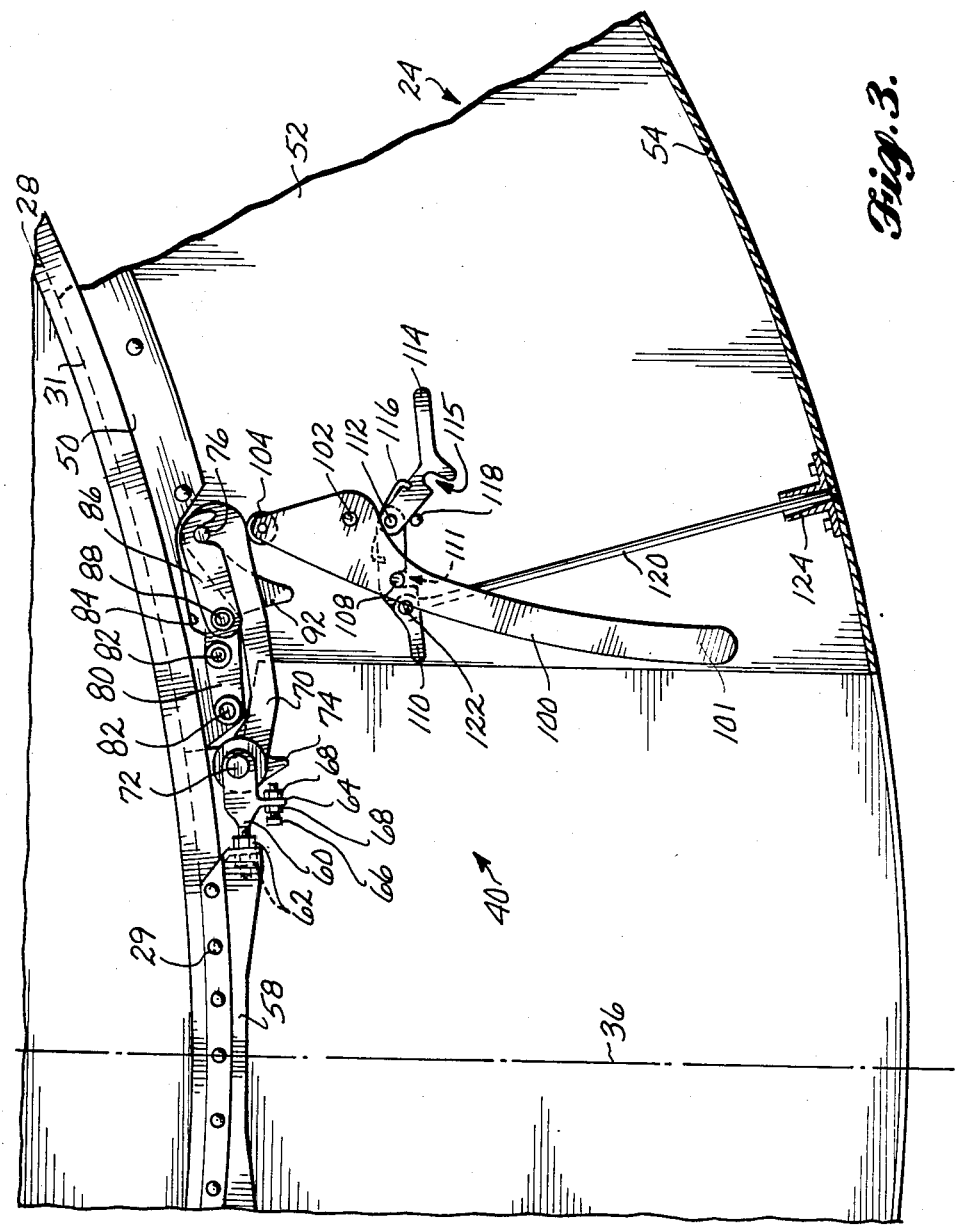
FIG. 3 is a front elevational view of a lower latch assembly in a latched and locked position.
Figure 4:
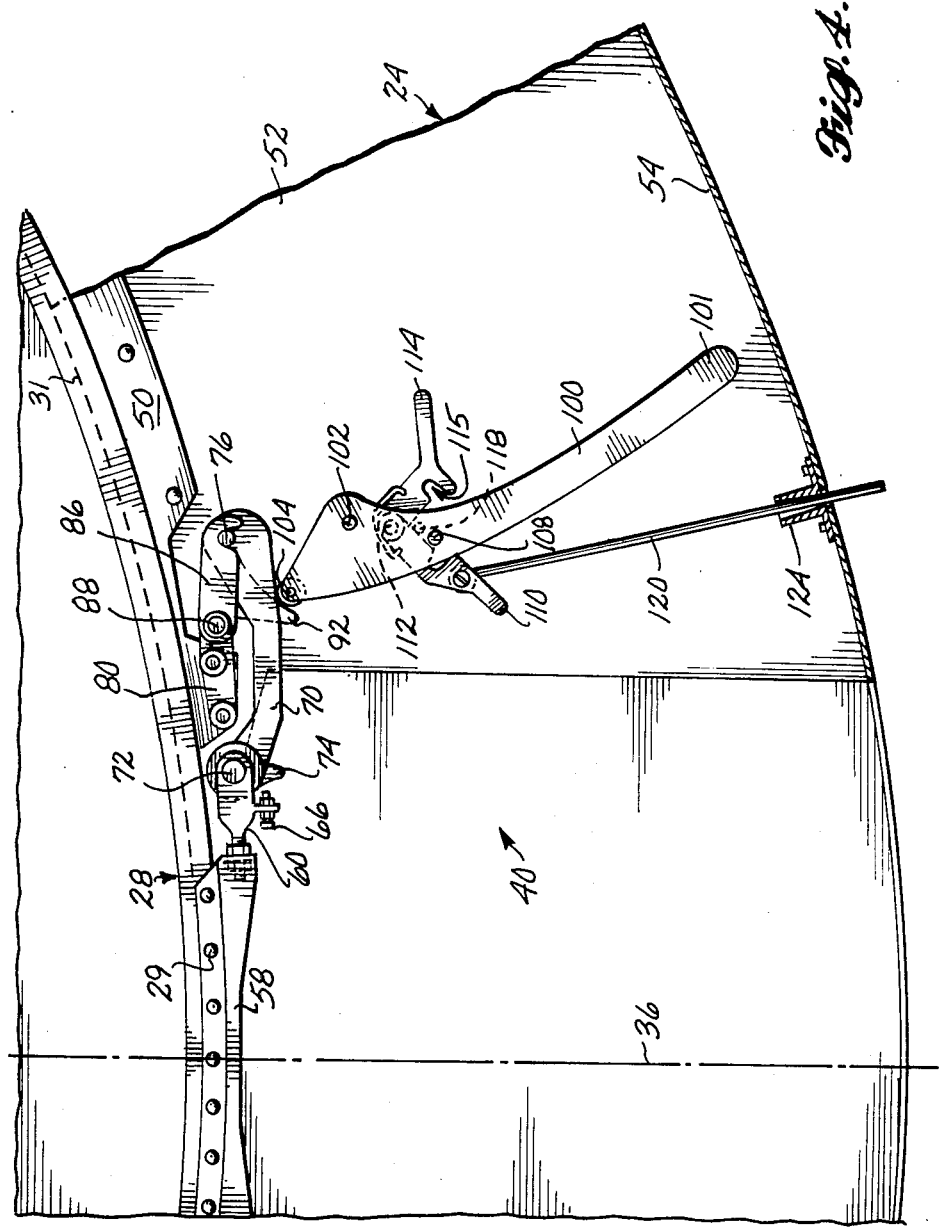
FIG. 4 is a front elevational view of the lower latch assembly of FIG. 3 in a partially unlatched position.
Figure 5:
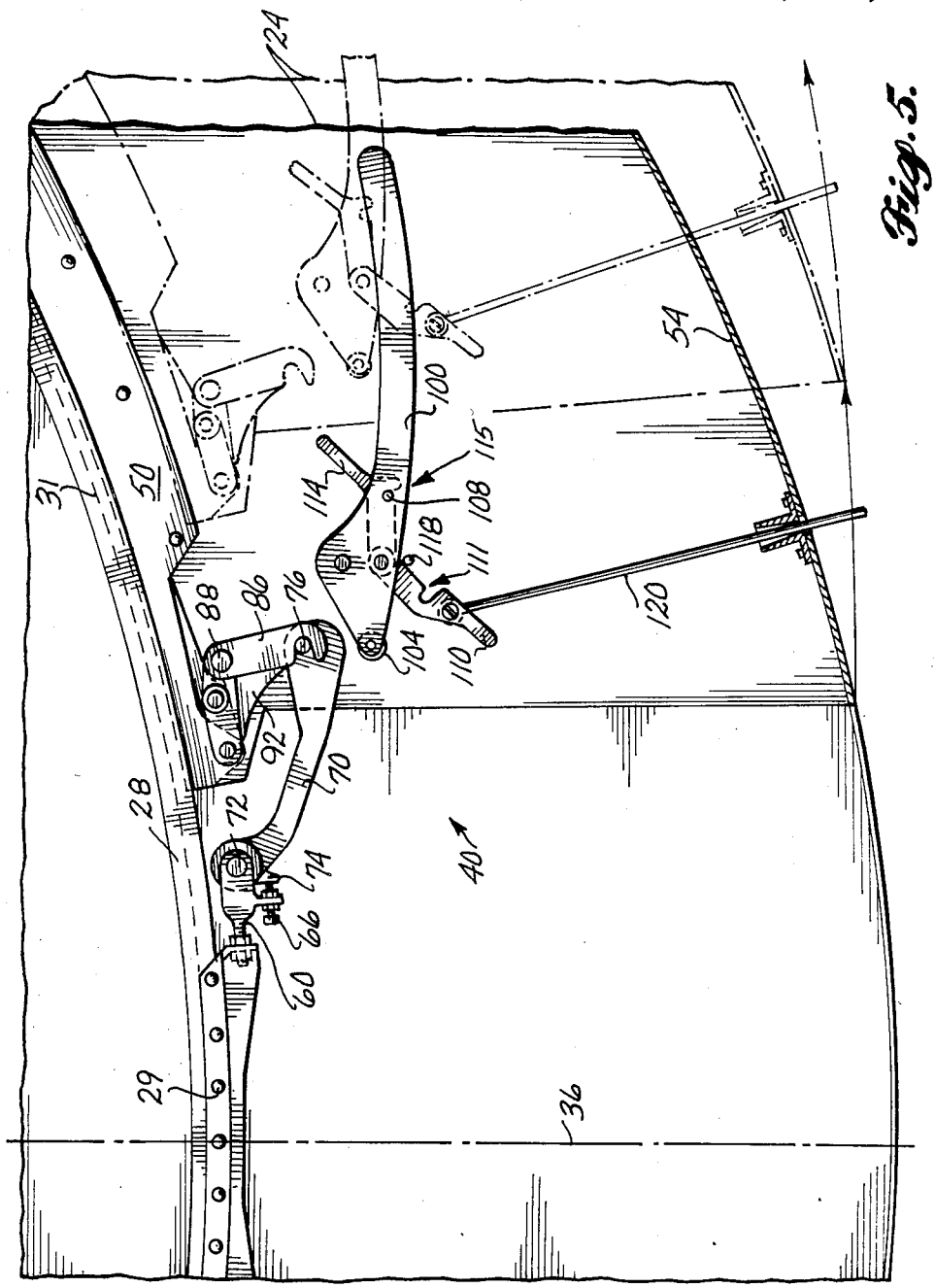
FIG. 5 is a front elevational view of the lower latch assembly of FIG. 3 in an unlatched position.

Lower latch assembly 40 is shown in greater detail in FIGS. 3 through 5. FIG. 3 shows the lower latch assembly in its fully latched and locked position with the thrust reverser duct 24 closed. FIG. 4 shows an intermediate stage in which the lock is released and the assembly is between latched and unlatched positions, and with the thrust reverser duct 24 still closed. FIGURE 5 shows the unlatched configuration. Lower latch assembly 44 is the mirror image of lower latch assembly 40 about centerline 36. In FIGS. 3 through 5, fan cowl 18 is open and is therefore not shown.

Referring initially to FIG. 3, the function of lower latch assembly 40 is to latch inner flange 50 to crosstie fitting 58, cross tie fitting 58 being in turn attached to the engine fan case 28 by attachments 29. The tension bearing links of the latch assembly include clevis 60, latch arm 70, latch engagement hook 86, and adapter plate 80. Clevis 60 is bolted to crosstie fitting 58 by means of adjusting nuts 62, such that the position of the clevis can be adjusted in a circumferential direction. Clevis 60 includes depending shoulder 64 that includes an opening through which positioning bolt 66 extends. Positioning bolt 66 is adjustably secured to shoulder 64 by nuts 68. The purpose of positioning bolt 66 is described below.

Latch arm 70 is pivotally secured to clevis 60 by pivot pin 72. Pivot pin 72 includes a torsion spring (not shown) that biases latch arm 70 in a downward (clockwise) direction. Latch arm 70 includes depending lip 74 adapted to abut positioning bolt 66 when the latch arm moves in a clockwise direction. The end of latch arm 70 remote from pivot pin 72 includes latch pin 76 affixed to the latch arm.

Adapter plate 80 is bolted to inner flange 50 by bolts 82. The adapter plate extends into a recess 84 formed by cutting away a portion of inner flange 50. Latch engagement hook 86 is connected to adapter plate 80 by pivot pin 88, pivot pin 88 including a torsion spring (not shown) that biases the latch engagement hook in a clockwise direction. Latch engagement hook 86 includes a depending trip member 92 whose function is described below. When the lower latch assembly is in the fully latched position shown in FIG. 3, latch engagement hook 86 engages latch pin 76 of latch arm 70, and the assembly is positioned such that latch pin 76 is slightly over center with respect to pivot pins 72 and 88. Therefore, hoop tension placed on lower latch assembly 40 by any opening force acting on thrust reverser duct 24 will tend to drive latch pin 76 upwards toward inner flange 50, tightening the latch and locking the thrust reverser duct in the closed position.

In FIG. 3, latch arm 70 is locked into its latched position by locking handle 100 such that even when the lower latch assembly is not under tension, latch arm 70 and latch engagement hook 86 cannot drop downward to release the latch. Locking handle 100 includes an extended lever arm 101 and is secured to forward bulkhead 52 by pivot pin 102. The locking handle also includes roller 104 that is adapted to abut latch arm 70 and prevent the latch arm from moving downward, thus securing it in the locked position. When locking handle 100 is in its fully locked position indicated in FIG. 3, roller 104 is slightly over center with respect to pivot pin 102, and any downward force exerted by latch arm 70 drives the locking handle clockwise to secure it in its locking position. Locking handle 100 is held in its locking position by means of locking pawl 110. Locking pawl 110 is connected to forward bulkhead 52 by pivot pin 112, and includes detent slot 111 which engages pin 108 extending rearwardly from locking handle 100. When locking pawl 110 so engages pin 108, the locking handle is prevented from rotating in either direction about pivot pin 102. Lower latch assembly 40 includes second locking pawl 114 and torsion spring 116 that are also connected to forward bulkhead 52 by pivot pin 112. Torsion spring 116 biases both locking pawls in a downward direction. As described below, detent slot 115 in locking pawl 114 serves to engage pin 108 when the lower latch assembly has been unlatched. Torsion spring 116 keeps locking pawl 110 or locking pawl 114, whichever one is active, engaged with pin 108 for securing locking handle in the locked or in the unlocked position. Torsion spring 116 also keeps locking pawl 110 or locking pawl 114, whichever one is inactive, in spring loaded position for automatic engagement with pin 108 when the locking handle is moved from one of its two secured positions to the other. In the latched configuration shown in FIG. 3, spring 116 holds inactive locking pawl 114 against stop pin 118 that extends from forward bulkhead 52.

Rod 120 is connected at one end to locking pawl 110 by pivot pin 122, the other end of rod 120 being slidingly received in guide 124. Guide 124 in turn is secured to the inner surface of outer flange 54. Rod 120 serves to visually indicate, to a person outside the thrust reverser duct, whether or not lower latch assembly 40 is locked. The nacelle may be constructed such that rod 120, when it protrudes from outer flange 54, also creates a physical interference that prevents the closing of fan cowl 18 until the thrust reverser duct is properly locked.

The sequence of latching and unlatching lower latch assembly 40 is illustrated by the sequence shown in FIGS. 3 through 5. Referring initially to FIG. 3, the unlocking sequence commences when an upward, clockwise force is exerted on locking pawl 110, such that detent slot 111 is released from pin 108. Locking handle 100 is then free to rotate in a counterclockwise direction. After a small amount of such counterclockwise rotation, roller 104 contacts trip member 92 depending from latch engagement hook 86. Continued counterclockwise rotation of locking handle 100 causes roller 104 to rotate the latch engagement hook downward (clockwise) which in turn rotates latch arm 70 downward. Downward motion of the latch arm is possible because roller 104 has at this point dropped a sufficient distance below the original latch arm position due to the rotation of locking handle 100. After latch arm 70 has rotated a short distance downward, latch pin 76 passes over center with respect to pivot pins 72 and 88, effectively releasing the latch. This is the configuration shown in FIG. 4. Once free of pin 108, locking pawl 110 moves downward until it contacts stop pin 118. When locking pawl 110 is in this position, rod 120 extends a short distance outside of outer flange 54, providing the safety feature of a visual indication that the latch is unlocked. Continued counterclockwise rotation of locking handle 100 causes roller 104 to drop beneath and out of contact with latch arm 70, and causes pin 108 of locking handle 100 to be engaged by detent slot 115 of locking pawl 114, such that the locking handle is now prevented from rotating in either direction and is thus secured in the unlocked position.

As soon as lower latch assembly has been released (FIG. 4), the thrust reverser duct may be moved rightward to a position such as that indicated in solid lines in FIG. 5. As a result of such motion, latch engagement hook 86 rotates clockwise until trip member 92 contacts inner flange 50, and latch arm 70 rotates clockwise until lip 74 contacts positioning bolt 66. Further clockwise rotation of both the latch arm and latch engagement hook is thereby prevented. Continued opening of thrust reverser duct 24 is illustrated by the phantom lines in FIG. 5.

Gravity and the springs associated with pivot pins 72 and 88 ensure that latch arm 70 and latch engagement hook 86 will remain in the relative positions shown in FIG. 5 as long as the thrust reverser duct remains open. Therefore when the thrust reverser duct is again closed, pin 76 of latch arm 70 will be positioned to engage latch engagement hook 86, as indicated in solid lines in FIG. 5. Locking handle 100 can then be released from locking pawl 114, and the locking handle rotated clockwise such that roller 104 forces latch arm 70 and latch engagement hook 86 back through the position shown in FIG. 4 and finally into the locked and latched position of FIG. 3. The leverage provided by lever arm 101 of locking handle 100 and the gravity forces acting on the thrust reverser duct facilitate the locking of the lower latch assembly against the frictional resistance to closing of inner flange 50 in V-groove 31. The toggle action resulting from the geometrical relationship of the elements of this latch guarantees that a very large circumferential closing force will be applied to inner flange 50 and cross tie 58 and the intervening elements of lower latch assembly 40 for a relatively low manual force applied to lever arm 101 of locking handle 100. This arrangement is very useful for overcoming friction and ensuring acceptable seating of inner flange 50 in V-groove 31 of fan case 28.

To minimize the weight of the lower latch assembly, lever arm 101 of locking handle 100 may be omitted, and the central portion of the locking handle near pivot pin 102 may instead be provided with a slot or analogous structure to securely receive a screwdriver or other tool that can serve the function of the lever arm.

Figure 6:
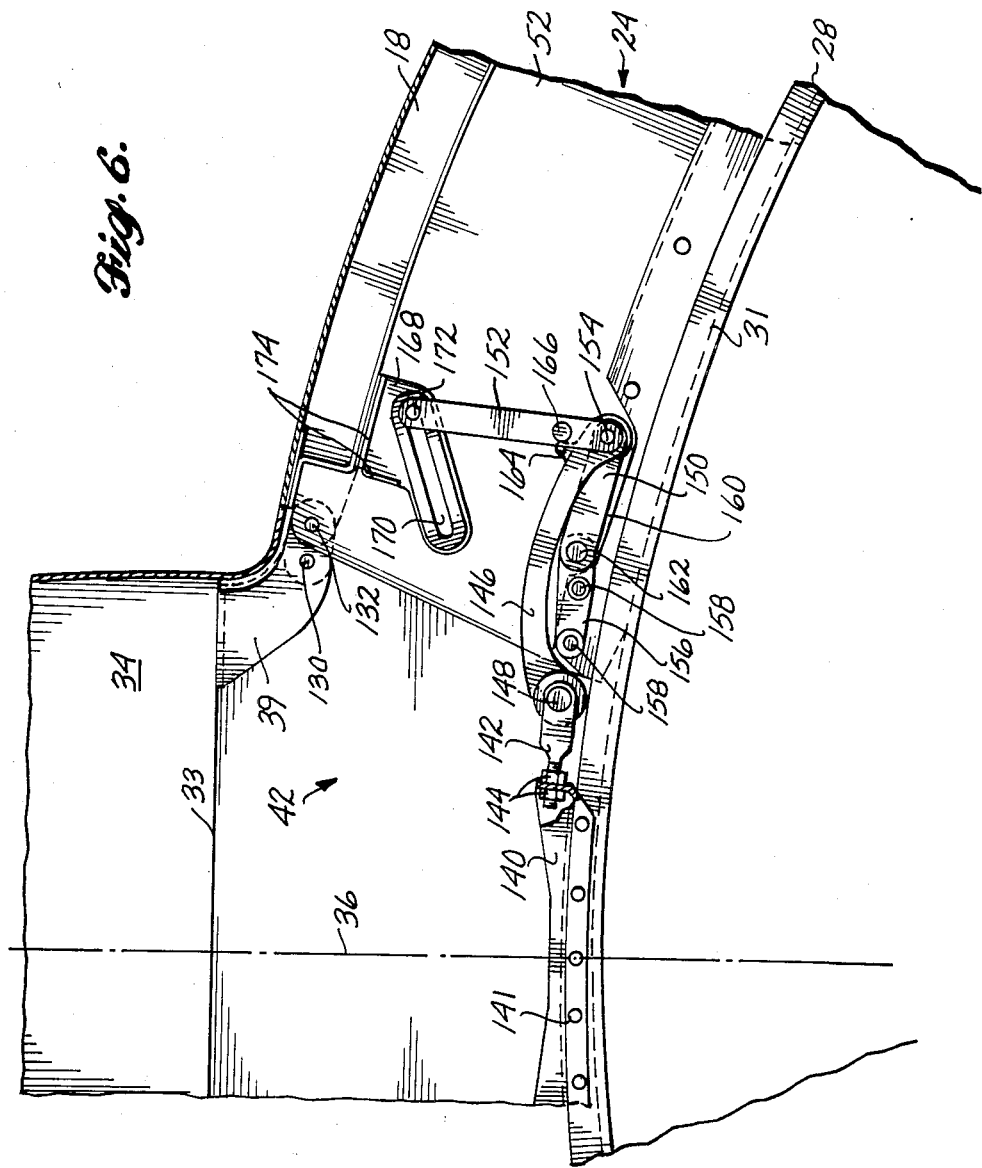
FIG. 6 is a front elevational view of an upper latch assembly in a locked and latched position.
Figure 7:
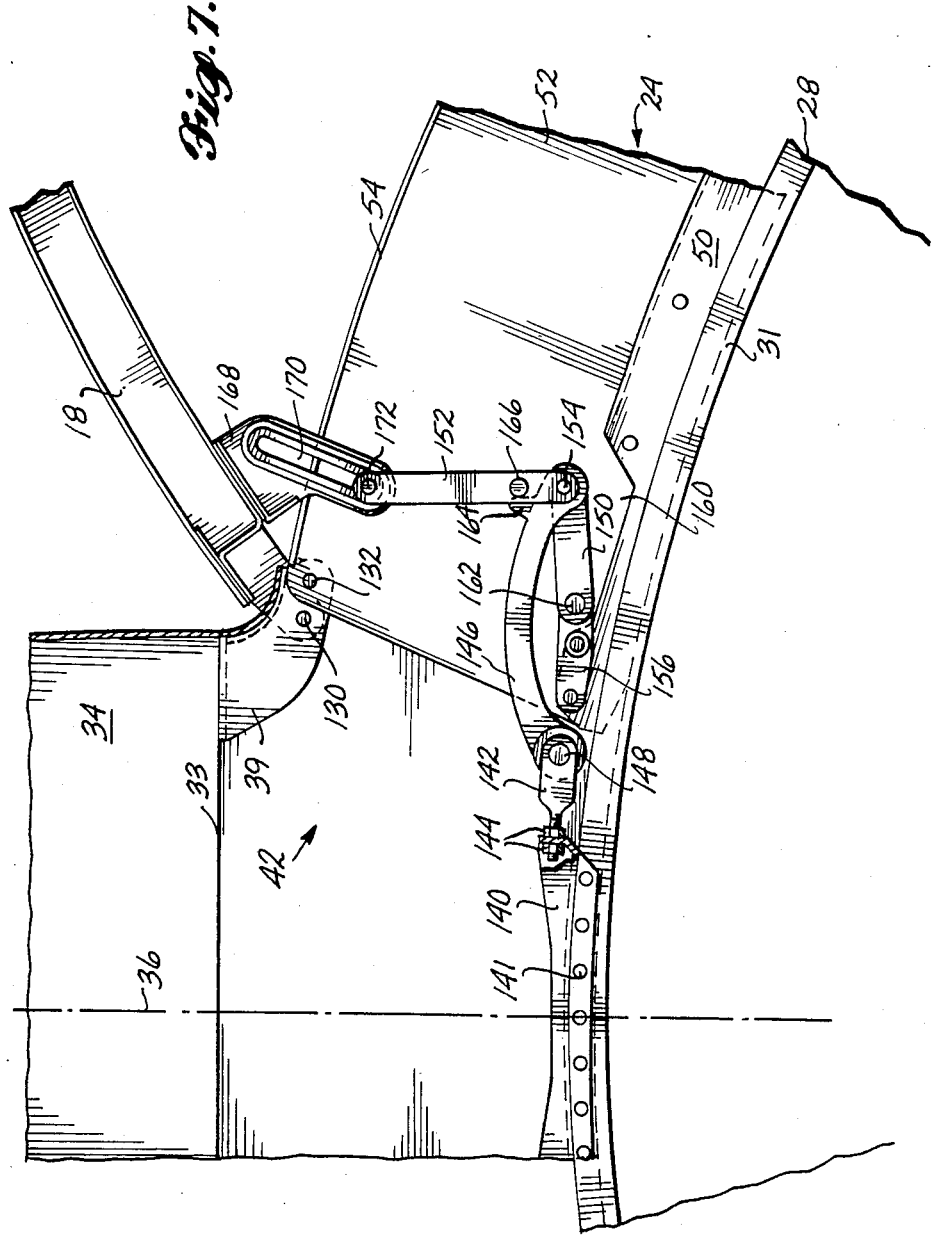
FIG. 7 is a front elevational view of the upper latch assembly of FIG. 6 in an unlatched position.

Upper latch assembly 42 is shown in detail in FIGS. 6-8. FIG. 6 shows the latch assembly in its fully latched and locked position. FIG. 7 shows the upper latch assembly in an unlocked and partially unlatched position with the fan cowl open and the thrust reverser duct still closed. FIG. 8 shows the upper latch assembly in the fully unlatched position, with both fan cowl 18 and thrust reverser duct 24 open. Fan cowl 18 is connected to support 39 at pivot point 130, and thrust reverser duct 24 is connected to support 39 at pivot point 132. Upper latch assembly 46 is a mirror image of upper latch assembly 42 about centerline 36.

The function of upper latch assembly 42 is to latch inner flange 50 to crosstie fitting 140 in such a manner that the structure will transmit circumferential loads across the junction but will still allow the thrust reverser duct 24 to open by rotation around pivot point 132. The tension bearing links of the upper latch assembly include clevis 142, latch arm 146, side link 150, and adapter plate 156. Cross tie fitting 140 is secured to engine fan case 28 by attachments 141. Clevis 142 is bolted to crosstie fitting 140 by means of adjusting nuts 144, such that the position of the clevis can be adjusted in a circumferential direction. Latch arm 146 is pivotally secured to clevis 142 by pivot pin 148. Latch arm 146 includes an upwardly projecting shoulder 164 whose function is described below. The end of latch arm 146 remote from pivot pin 148 is connected to side link 150 by pivot pin 154.

Adapter plate 156 is bolted to inner flange 50 by bolts 158. The adapter plate extends into a recess 160 formed by cutting away a portion of inner flange 50. Side link 150 is connected to adapter plate 156 by pivot pin 162. When the upper latch assembly is in the fully latched position shown in FIG. 6, pivot pin 154 is slightly over center with respet to pivot pins 162 and 148. Circumferential force acting through upper latch assembly 42 therefore drives pivot point 154 and latch arm 146 downward into inner flange 50, tightening the latch.

FIG. 6 illustrates latch arm 146 locked into its latched position by fan cowl link 152. One end of fan cowl link 152 is connected to pivot pin 154. The other end of the fan cowl link includes guide pin 172 that is slidingly received in slot 170 of guide 168. Guide 168 is in turn connected to fan cowl 18, shims 174 being used to adjust the position of the guide with respect to the fan cowl. The position and orientation of guide 168 and slot 170 is such that when fan cowl 18 is closed, guide pin 172 is in the radially outermost position in slot 170, such that fan cowl link 152 is not free to move upwards. Therefore when the upper latch assembly is in such a locked configuration (FIG. 6), latch arm 146 is not free to move upwards, and upper latch assembly 42 is locked.

When fan cowl 18 begins to move from its closed position illustrated in FIG. 6 to an open position, guide 168 begins to rotate about pivot point 130. Because of the orientation of slot 170 with respect to pivot point 130, latch arm 146 and pivot point 154 can remain in their latched positions shown in FIG. 6 only if fan cowl link 152 can rotate counterclockwise such that guide pin 172 moves leftward in slot 170. Leftward motion of the guide pin, however, is prevented by stop pin 166 that extends from fan cowl link 152 and abuts shoulder 164 on latch arm 146. As a result, fan cowl link 152 is forced to move in an upward direction in response to the opening motion of fan cowl 18. Even if slot 170 were oriented differently, continued opening of fan cowl 18 would eventually cause guide pin 172 to contact the bottom of the slot, causing the fan cowl link to move upward. The upward motion of fan cowl link 152 rotates latch arm 146 and side link 150 upwards, pivoting about pivot pins 148 and 154, respectively, such that pivot pin 154 passes over center with respect to pivot pins 148 and 162. At this point, upper latch assembly 42 is unlocked and unlatched. FIG. 7 shows the configuration of upper latch assembly 42 with fan cowl 18 fully open. Since in this configuration fan cowl link 152 can move upwards without rotating leftward, and since pivot pin 154 has passed over center with respect to pivot pins 148 and 162, thrust reverser duct 24 is now free to open assuming that lower latch assembly 40 has been released. FIG. 8 shows the configuration of the upper latch assembly with both fan cowl 18 and thrust reverser duct 24 open. Side link 150 has pivoted through an angle of greater than 90° in relation to inner flange 50 from its position in FIG. 7, and guide pin 172 has moved to the upper end of slot 170. The closing of thrust reverser duct 24 and fan cowl 18 is the reverse of the above-described sequence.

While the preferred embodiments of the invention have been illustrated and described, it should be understood that variations will be apparent to those skilled in the art. Accordingly, the invention is not to be limited to the specific embodiments illustrated and described herein, and the true scope and spirit of the invention are to be determined by reference to the following claims.

The embodiments of the invention in which an exclusive property or privilege is claimed are defined as follows:

1. A latch system for an aircraft nacelle, the nacelle comprising first and second cowls, each cowl being hingedly mounted to the nacelle for pivotal movement between a closed position adapted for aircraft operation and one or more open positions wherein access is provided to interior portions of the nacelle, the first and second cowls being positioned adjacent and in side-to-side relationship with one another, the first cowl including a first edge along which the first cowl is hingedly mounted to the nacelle, the latch system comprising latch means movable to and from a latched position in which the latch means is connected to the first cowl at the first edge and holds the first cowl in its closed position and prevents the first cowl from moving to an open position, the latch means including locking means associated with a second cowl for holding the latch means in its latched position when the second cowl is in its closed position, whereby the first cowl is held in its closed position when the second cowl is in its closed position.

2. The latch system of claim 1, further comprising second latch means selectively operable when the first cowl is in its closed position to connect the first cowl to the nacelle adjacent a second edge of the first cowl opposite the first edge.

3. The latch system of claim 1, wherein the latch means comprises a first link arm pivotally connected to the nacelle at a first pivot point, a second link arm pivotally connected to the first cowl at a second pivot point, and nondisengaging connecting means connecting the first link arm to the second link arm such that the first cowl remains connected through the latch means to the nacelle when the first cowl is moved to an open position.

4. The latch system of claim 3, wherein the locking means comprises a link interengaged between the second cowl and the connecting means.

5. The latch system of claim 4, wherein the locking means comprises a guide connected to the second cowl and having a slot formed therein, and means for slidingly mounting a first end of the link in the slot.

6. The latch system of claim 3, wherein the first and second link arms are pivotally connected to one another at a common pivot point, and wherein the latch means is adapted such that when the latch means is in its latched position, the first and second link arms extend generally parallel to the first cowl with the common pivot point located slightly radially inward and over center with respect to the first and second pivot points, whereby tension tending to move the first cowl to an open position tightens the latch means.

7. The latch system of claim 6, wherein the locking means is adapted to prevent the common pivot point from moving radially outward when the second cowl is in its closed position.

8. The latch system of claim 1, wherein the first cowl comprises a semicylindrical sheet member having spaced apart inner and outer surfaces, the first cowl being hingedly mounted to the nacelle along the first edge at the outer surface of the first cowl, and wherein the latch means in its latched position is connected to the first edge of the first cowl at the inner surface of the first cowl.

9. The latch system of claim 8, wherein the first cowl includes a load bearing ring segment extending along the inner surface of the first cowl, and wherein the latch means in its latched position engages a first end of the ring segment.

10. The latch system of claim 9, further comprising second latch means selectively operable when the first cowl is in its closed position to connect a second end of said ring segment opposite the first end to the nacelle.

11. The latch system of claim 9, wherein the latch means comprises a first link arm pivotally connected to the nacelle at a first pivot point, a second link arm pivotally connected to the first cowl at a second pivot point, and nondisengaging connecting means connecting the first link arm to the second link arm such that the first cowl remains connected through the latch means to the nacelle when the first cowl is moved to an open position.

12. The latch system of claim 11, wherein the locking means comprises a link interengaged between the second cowl and the connecting means.

13. The latch system of claim 12, wherein the locking means comprises a guide connected to the second cowl and having a slot formed therein, and means for slidingly mounting a first end of the link in the slot.

14. The latch system of claim 11, wherein the first and second link arms are pivotally connected to one another at a common pivot point, and wherein the latch means is adapted such that when the latch means is in its latched position, the first and second link arms extend generally parallel to the first cowl with the common pivot point located slightly radially inward and over center with respect to the first and second pivot points, whereby tension tending to move the first cowl to an open position tightens the latch means.

15. The latch system of claim 14, wherein the locking means is adapted for preventing the common pivot point from moving radially outward when the second cowl is in its closed position.

16. A latch system for an aircraft nacelle, the nacelle comprising left and right first cowls and left and right second cowls, each cowl being hingedly mounted to the nacelle for pivotal movement between a closed position adapted for aircraft operation and one or more open positions wherein access is provided to interior portions of the nacelle, the right first cowl and right second cowl being positioned adjacent and in side-to-side relationship with one another such that when the right first and second cowls are in their closed positions, they form an approximately continuous surface extending along the right side of the nacelle, the left first and left second cowls being positioned adjacent and in side-to-side relationship with one another such that when both left cowls are in their closed positions, they form an approximately continuous surface extending along the left side of the nacelle, each first cowl including a first edge along which the first cowl is hingedly mounted to the nacelle, the left and right first cowls in their closed positions substantially defining a cylindrical passage, the latch system comprising latch means associated with each first cowl, each latch means being movable to and from a latched position in which the latch means is connected to the associated first cowl at the first edge thereof and holds the associated first cowl in its closed position and prevents the associated first cowl from moving to an open position, each latch means including locking means associated with the adjacent second cowl for holding the latch means in its latched position when said adjacent second cowl is in its closed position, whereby each first cowl is held in its closed position when the adjacent second cowl is in its closed position.

17. The latch system of claim 16, further comprising, for each first cowl, second latch means selectively operable when the first cowl is in its closed position to connect the first cowl to the nacelle adjacent a second edge of the first cowl opposite the first edge.

18. The latch system of claim 16, wherein each latch means comprises a first link arm pivotally connected to the nacelle at a first pivot point, a second link arm pivotally connected to the associated first cowl at a second pivot point, and nondisengaging connecting means connecting the first link arm to the second link arm such that the first cowl remains connected through the latch means to the nacelle when the first cowl is moved to an open position.

19. The latch system of claim 18, wherein each locking means comprises a link interengaging between the associated second cowl and the connecting means.

20. The latch system of claim 19, wherein each locking means comprises a guide connected to the associated second cowl and having a slot formed therein, and means for slidingly mounting a first end of the link in the slot.

21. The latch system of claim 18, wherein for each latch means, the first and second link arms are pivotally connected to one another at a common pivot point, and the latch means is adapted such that when the latch means is in its latched position, the first and second link arms extend generally parallel to the first cowl with the common pivot point located slightly radially inward and over center with respect to the first and second pivot points, whereby tension tending to move the associated first cowl to an open position tightens the latch means.

22. The latch system of claim 21, wherein each locking means is adapted to prevent the common pivot point of the associated latch means from moving radially outward when the associated second cowl is in its closed position.

23. The latch system of claim 16, wherein each first cowl comprises a semicylindrical sheet member having spaced apart inner and outer surfaces, the first cowl being hingedly mounted to the nacelle along the first edge at the outer surface of the first cowl, and wherein the associated latch means in its latched position is connected to the first edge of the first cowl at the inner surface of the first cowl.

24. The latch system of claim 23, wherein each first cowl includes a load bearing ring extending along the inner surface of the first cowl, the ring having a first end adjacent the first edge of the first cowl and a second end, the associated latch means in its latched position engaging the first end of the ring.

25. The latch system of claim 24, further comprising second latch means selectively operable when both first cowls are in their closed positions to connect the second ends of the rings of the first cowls to one another.

26. The latch system of claim 25, wherein the second latch means comprises a crosstie member and two second latches respectively associated with the first cowls, each second latch being selectively operable independently of the other second latch to connect its associated first cowl to the crosstie member.

27. The latch system of claim 24, wherein each latch means comprises a first link arm pivotally connected to the nacelle at a first pivot point, a second link arm pivotally connected to the associated first cowl at a second pivot point, and nondisengaging connecting means connecting the first link arm to the second link arm such that the first cowl remains connected through the latch means to the nacelle when the first cowl is moved to an open position.

28. The latch system of claim 27, wherein each locking means comprises a link interengaged between the associated second cowl and the connecting means.

29. The latch system of claim 28, wherein each locking means comprises a guide connected to the associated second cowl and having a slot formed therein, and means for slidingly mounting a first end of the link in the slot.

30. The latch system of claim 27, wherein for each latch means, the first and second link arms are pivotally connected to one another at a common pivot point, and the latch means is adapted such that when the latch means is in its latched position, the first and second link arms extend generally parallel to the first cowl with the common pivot point located slightly radially inward and over center with respect to the first and second pivot points, whereby tension tending to move the associated first cowl to an open position tightens the latch means.

31. The latch system of claim 30, wherein each locking means is adapted for preventing the common pivot point of the associated latch means from moving radially outward when the associated second cowl is in its closed position.

32. A latch for an aircraft nacelle, the nacelle comprising a cowl hingedly mounted to the nacelle for pivotal movement between a closed position adapted for aircraft operation and one or more open positions wherein access is provided to interior portions of the nacelle, the latch comprising toggle linkage means movable to and from a latched position in which the toggle linkage means engages the cowl and holds the cowl in its closed position and prevents it from moving to an open position, the toggle linkage means comprising a first link arm pivotally connected to the nacelle at a first pivot point, a second link arm pivotally connected to the cowl at a second pivot point, and connecting means for connecting the first link arm to the second link arm at a connection point when the toggle linkage means is in its latched position, the latch further comprising locking means for holding the toggle linkage means in its latched position, the locking means comprising a locking member pivotally mounted to the nacelle for rotation about a third pivot point to and from a locking position in which a contact surface of the locking member abuts the toggle linkage means adjacent the connection point and holds the toggle linkage means in its latched position, the locking means being positioned such that when the locking means is in its locking position, the contact surface lies approximately along a line between the connection point and the third pivot point.

33. The latch of claim 32, wherein the cowl comprises a semicylindrical sheet member having opposed first and second edges, the cowl being hingedly mounted to the nacelle along the first edge, and the toggle linkage means being adapted to engage the cowl at the second edge.

34. The latch of claim 32, wherein the toggle linkage means is adapted such that when the toggle linkage means is in its latched position, the first and second link arms extend generally parallel to the cowl and the connection point is located slightly radially inward and over center with respect to the first and second pivot points, whereby tension tending to move the cowl to an open position tightens the toggle linkage means.

* * * * *